(12) United States Patent
Gorka

(10) Patent No.: US 11,040,634 B2
(45) Date of Patent: Jun. 22, 2021

(54) POWER ELECTRONICS APPARATUS AND CONTROL METHOD FOR AN ELECTRIC MACHINE AND FOR ELECTRICAL ENERGY STORES

(71) Applicant: Bayerische Motoren Werke Aktiengesellschaft, Munich (DE)

(72) Inventor: Matthias Gorka, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 39 days.

(21) Appl. No.: 14/077,991

(22) Filed: Nov. 12, 2013

(65) Prior Publication Data

US 2014/0070736 A1    Mar. 13, 2014

Related U.S. Application Data

(63) Continuation of application No. PCT/EP2012/058420, filed on May 8, 2012.

(30) Foreign Application Priority Data

May 10, 2011 (DE) .................. 10 2011 075 560.8

(51) Int. Cl.
*B60L 58/20* (2019.01)
*B60L 50/51* (2019.01)
(Continued)

(52) U.S. Cl.
CPC .......... *B60L 58/20* (2019.02); *B60L 11/1868* (2013.01); *B60L 50/40* (2019.02); *B60L 50/51* (2019.02);
(Continued)

(58) Field of Classification Search
CPC ..... G09G 2310/065; G09G 2320/0252; G09G 2320/0257; G09G 3/2014; G09G 3/2018;
(Continued)

(56) References Cited

U.S. PATENT DOCUMENTS 7,538,449 B2   5/2009   Schreiber
7,710,065 B2*  5/2010   Sato ................. H02J 1/102
                                                307/43
(Continued)

FOREIGN PATENT DOCUMENTS

DE   10 2008 037 064 A1   2/2010
EP        0 588 388 A2    3/1994
(Continued)

OTHER PUBLICATIONS

Shuai Lu, A New Method of Utilizing Ultra-Capacitor Energy Sources in Hybrid Electric Vehicles Over a Wide Speed Range, APEC 07, 2007, pp. 222-228 (Year: 2007).*
(Continued)

*Primary Examiner* — Bickey Dhakal
(74) *Attorney, Agent, or Firm* — Crowell & Moring LLP

(57) ABSTRACT

A power electronics arrangement includes an inverter to which an electric machine can be connected, and at least one half bridge to which at least two electric energy storage devices can be connected. One of the at least two electric energy storage devices at least temporarily supplies the electric machine, and one of the electric energy storage devices at least temporarily charges another energy storage device of the at least two electric energy storage devices by way of the electric machine and one of the half bridges. For this purpose, a control method for the power electronics arrangement operates according to the principle of space vector modulation.

10 Claims, 4 Drawing Sheets

(51) Int. Cl.
*H02P 21/00* (2016.01)
*B60L 50/40* (2019.01)
*B60L 11/18* (2006.01)
*H02M 1/00* (2006.01)

(52) U.S. Cl.
CPC ........... *H02P 21/00* (2013.01); *B60L 2210/10* (2013.01); *H02M 2001/007* (2013.01); *Y02T 10/70* (2013.01); *Y02T 10/72* (2013.01)

(58) Field of Classification Search
CPC .. H03F 3/2173; B60L 11/005; B60L 11/1803; B60L 11/1868; B60L 2210/10; Y02T 10/7011; Y02T 10/7016; Y02T 10/7022
USPC .................. 318/139; 320/104, 127, 137, 165
See application file for complete search history.

(56) References Cited

U.S. PATENT DOCUMENTS

| | | | |
|---|---|---|---|
| 8,487,568 B2 | 7/2013 | Franke | |
| 2007/0216339 A1* | 9/2007 | Yoshimoto | H02M 7/483 318/800 |
| 2009/0034308 A1 | 2/2009 | Welchko et al. | |
| 2010/0085019 A1* | 4/2010 | Masuda | H02J 7/1453 320/152 |
| 2010/0096926 A1 | 4/2010 | King et al. | |
| 2012/0281444 A1* | 11/2012 | Dent | H02M 1/32 363/56.01 |

FOREIGN PATENT DOCUMENTS

| | | |
|---|---|---|
| EP | 1 710 115 A2 | 10/2006 |
| EP | 1 834 825 A1 | 9/2007 |

OTHER PUBLICATIONS

Shuai Lu, High Efficiency Energy Storage System Design for Hybrid Electric Vehicle with Motor Drive Integration, IEEE, 2006, pp. 2560-2567 (Year: 2006).*
International Preliminary Report on Patentability dated Nov. 12, 2013 (PCT/IB/373), including English translation of Written Opinion ((PCT/ISA/237) (eight (8) pages)).
International Search Report with English translation dated Oct. 5, 2011 (6 pages).
European Office Action issued in European counterpart application No. 12 719 712.7-1927 dated Nov. 28, 2017 (Seven (7) pages).
Lu et al.: "A New Method of Utilizing Ultra-Capacitor Energy Sources in Hybrid Electric Vehicles Over a Wide Speed Range", Applied Power Electronics Conference, APEC 2007, $22^{nd}$ Annual IEEE, 2007, pp. 222-228.
Lu et al.: "High Efficiency Energy Storage System Design for Hybrid Electric Vehicle with Motor Drive Integration", Industry Applications Conference, 2006, $41^{st}$ IAS Annual Meeting Conference Record of the 2006 IEEE, vol. 5, 2006, pp. 2560-2567.

* cited by examiner

POWER ELECTRONICS APPARATUS AND CONTROL METHOD FOR AN ELECTRIC MACHINE AND FOR ELECTRICAL ENERGY STORES

CROSS REFERENCE TO RELATED APPLICATIONS

This application is a continuation of PCT International Application No. PCT/EP2012/058420, filed May 8, 2012, which claims priority under 35 U.S.C. § 119 from German Patent Application No. 10 2011 075 560.8, filed May 10, 2011, the entire disclosures of which are herein expressly incorporated by reference.

BACKGROUND AND SUMMARY OF THE INVENTION

The invention relates to a power electronics arrangement and a control method for an electric machine and for electric energy storage devices, a control method for the operation of the power electronics arrangement as well as a motor vehicle equipped with the power electronics arrangement, the electric machine and the electric energy storage device.

Hybrid or electric vehicles have an electrified drive train. This drive train has a first energy storage device, for example, a secondary lithium ion battery, as well as an electric machine, such as a permanently excited synchronous machine, which can be driven by a motor and a generator.

A power electronic system communicates between the energy storage device and the electric machine and regulates the energy and power flow in the electric drive train. This power electronic system usually consists of a bidirectional rectifier or inverter for the motor-driven and generator-driven operation of the electric machine. In addition to the first energy storage device, the hybrid or electric vehicle has a second energy storage device, which predominantly supplies components and consuming devices, which are known from the onboard power supply system of a motor vehicle, with a conventional internal-combustion engine drive. This may, for example, be a radio or the exterior lighting system of the vehicle. In a hybrid or electric vehicle, the second energy storage device is primarily supplied by way of a direct dc converter, which is also called a dc-dc converter, from the high-voltage onboard power supply system. The direct dc converter may be designed to be unidirectional or bidirectional. The second energy storage device may particularly be a supercap storage unit or a 12 V lead acid battery. A fuel cell or lithium ion battery may also be used.

Normally, the inverter and the direct dc converter are constructed to be functionally and structurally separate from one another. Conceivable synergistic effects of these power-electronic components therefore remain unutilized.

The state of the art contains approaches which confront this disadvantage. DE 10 2008 037 064 A1, for example, describes a circuit arrangement to which the two electric energy storage devices can be connected, in which case one of the energy storage devices supplies an electric machine at least temporarily. Energy compensation operations are made possible by the circuit arrangement. At least temporarily, the circuit arrangement from DE 10 2008 037 064 A1 combines, in other words, the functionalities of a direct dc converter and of an inverter. In this case, the normal control concepts of inverters for electric machines are reused.

It is an object of the invention to provide an improved power electronics arrangement and, particularly, an improved control method of the power electronics arrangement for an electric machine and an electric energy storage device.

This and other objects are achieved by a power-electronics arrangement, and a control method for an electric machine, which comprises an inverter, to which the electric machine can be connected, and at least one half bridge, to which the at least two electric energy storage devices can be connected. The power-electronics arrangement is characterized in that at least one of the at least two electric energy storage devices, at least temporarily, supplies the electric machine, and that at least one of the electric energy storage devices, at least temporarily, charges at least one other electric storage device of the at least two electric energy storages devices by way of the electric machine and at least by way of the half bridge.

This is synonymous with the fact that at least one of the electric energy storage devices supplies electric power to the electric machine, and at least one of the electric storage devices charges at least another of the electric energy storage devices. In the case of two half bridges or more than two half bridges, each of the half bridges is connected with at least one electric energy storage device. In each case, a switch of the half bridges and the electric energy storage devices is connected parallel. A charging current can then be guided either by way of no half bridge or by way of an arbitrary number of half bridges.

The advantage is thereby achieved that the power-electronics arrangement, which is also called a power electronic system and, in addition to the inverter, has a half-bridge, with respect to this further energy storage device(s), which is charged, has the functionality of a direct dc converter, while the power electronic system does not comprise a direct dc converter.

According to a particularly preferred embodiment of the present invention, a switching method for the operation of the power-electronics arrangement according to the space vector modulation principle, known to a person skilled in the art, is used. In that case, as a result of a clock pulse of the inverter, a predefined space vector is set by vector addition of space vectors in the space vector model for generating the stator rotating field. Furthermore during this clock pulse of the inverter, a first space vector is set for a first switching time and, during this clock pulse of the inverter, the setting vector diametrically opposite the space vector is set for a second switching time.

This has the special advantage that, during a clock pulse, the current direction in the stator train, which correlates with the first space vector, in maintained, on the one hand, and, on the other hand, the current direction between the half bridge and the inverter is reversed. This is achieved by the setting of the space vector diametrical to the first space vector. Both space vectors contribute to the addition of all vectors set during the clock pulse, in order to generate a space vector predefined for the corresponding clock pulse.

Preferably, during the first switching time, during which the first space vector is set or, during the second switching time, during which the second space vector is set, at least one half bridge is switched over in order to charge an energy accumulator.

The special advantage consists of the fact that, during the clock pulse between the half bridge and the inverter, a current flow takes place in both current directions. In this case, the current which is correlated with the technical current direction in the direction of the positive potential of at least one electric energy storage device, can be utilized for charging this energy storage device if the latter is conductively connected with the half bridge.

According to a further variant of the present invention, a motor vehicle includes the power-electronics arrangement, the electric machine and the electric energy storage device. The power-electronic system is operated after the switching process in order to charge at least one of the electric storage devices in a targeted manner.

This creates the special advantage, particularly for hybrid and electric vehicles, that a power-electronics arrangement can be installed which saves space and weight and combines the functionality of an inverter and of a direct dc converter. In order to achieve this advantage, the power electronic system is operated by use of the switching process according to the invention.

The invention is based on the considerations described in the following. Nowadays, hybrid and electric vehicles usually have a high-voltage battery with a voltage of approximately 300 V to 400 V, and a low-voltage battery. The high-voltage battery is connected to an electric motor by way of an inverter, i.e. a rectifier and/or an inverter. The low-voltage battery feeds the conventional 12 V onboard power supply system with electric consuming devices, such as a radio, the low beams, etc. The low-voltage battery is charged from the high-voltage battery by means of a dc-dc converter or direct dc converter. According to the state of the art, current hybrid vehicles have a rectifier and/or inverter and a separate dc-dc converter. In addition, there are vehicle concepts where two technologically different electric energy storage devices, for example, dual-layer capacitors, lithium ion batteries, lead acid batteries or fuel cells are combined in the energy management such that their specific advantages can be utilized, which may be the result, for example, of the energy density or the power density of the respective storage devices. A possible combination would, for example, be an electric storage device of dual-layer capacitors, which is capable of briefly yielding very high power, and of a lithium ion battery for providing electric energy.

In this case, it is a disadvantage that current hybrid and electric vehicles comprise two separate devices in order to permit an optimal energy and power management of the electric storage devices and of the electric machine. Since, as a result of the type of construction, the inverter and the dc-dc converter have considerable similarities, a switching process is suggested for a circuit arrangement which combines an inverter and a direct dc converter and permits a targeted energy and power management of the storage devices and of the electric machine.

For this purpose, the construction of the inverter is slightly changed in that an additional half bridge is integrated. When a certain control method of the inverter and of the half bridge based on the space vector modulation is applied to this process, electric energy can be transferred between the electric energy storage devices in a targeted manner. In comparison to the conventional switching processes according to the state of the art, in the case of the suggested switching process, only two additional switching edges are required in the inverter bridges for each clock pulse period, so that additional switching losses are also minimized.

This measure has the advantage that no separate direct dc converter has to be installed because the latter can be integrated in the electronic system of the inverter with only slight modifications. By use of a single power-electronic modular unit, an electric machine and two electric storage devices can be operated. In particular, the electric energy storage devices can be charged and discharged without the use of a separate direct current converter in a targeted manner and according to a predefined operating strategy.

The provided measure functions in the case of a stationary as well as in the case of a rotating electric machine. In addition, the system is not limited with respect to the flow direction of the electric (charging) power and the voltage level, i.e. the energy transport between the storage devices can take place at any time, irrespective of their current voltage. A raising or lowering can take place as in the case of the use of a direct dc converter. The process does not change the motor position of the electric machine, so that the operation of the electric machine is not influenced. The integration of the dc-dc converter in the inverter permits the elimination of electric components, such as the inductance of the dc-dc converter. This results in lower weight, less space requirement and lower costs. In addition, the utilization capacity of the electric machine is improved because the control process, in comparison to the conventional control, provides fewer zero vector periods in the model of the space vector modulation.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
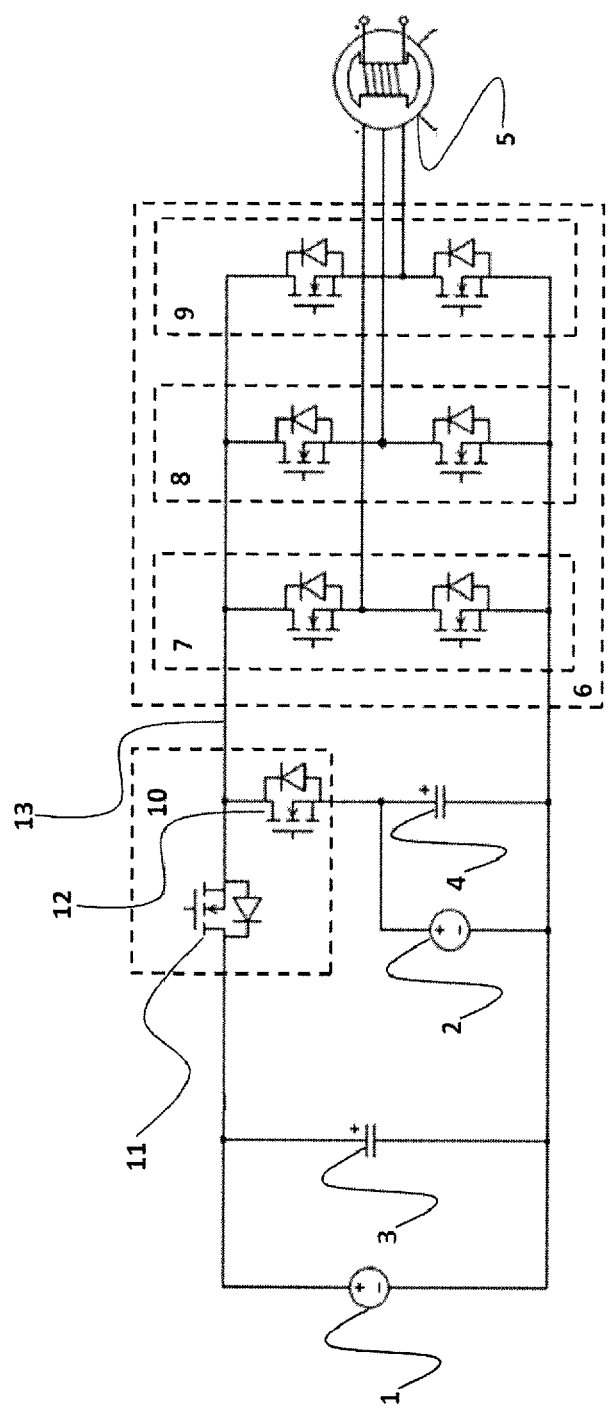
FIG. 1 is a schematic view of the electronic power system.

FIG. 1 is a schematic view of an onboard power supply system of a motor vehicle, particularly of a hybrid or electric vehicle. The onboard power supply system has a first electric energy storage device 1 and a second electric storage device 2. A capacitor can, in each case, be switched parallel to the two energy storage devices. These capacitors are called intermediate circuit capacitors 3, 4 and are primarily used for the buffering of reactive power, for voltage stabilization and for the protection of components. The vehicle has an electric machine 5 which can be driven as a motor or a generator. In this embodiment, the motor operation of the electric machine is primarily considered. The electric machine can, in particular, be a three-phase induction motor or a permanently or externally excited synchronous machine.

The three-phase alternating current with which the electric machine is supplied is generated by way of an inverter 6 at a certain point in time from the direct voltage of one of the two electric storage devices 1 or 2. The inverter, which is also called a dc-ac converter, has three parallel-connected inverter bridges 7, 8 and 9. This is, in each case, a series circuit consisting of two electric switches. The electric switches are constructed as controllable switches, such as transistors, IGBTs or MOSFETs. At no point in time, are either both switches of an inverter bridge closed or—except when there is an idle time—are both switches open. Each inverter bridge can therefore take up only two switching states. One switching state is characterized in that one of the two switches is closed and the other of the two switches is opened. Each inverter bridge has a center tap between the two respective switches. The center taps are connected with the three, for example, in star-connected coil groups of the stator of the electric machine.

According to the nomenclature for electric machines known to a person skilled in the art, the path of the electric machine connected with the center tap of the first inverter bridge 7 is called phase U; the path of the electric machine connected with the center tap of the second inverter bridge 8 is called phase V; and the path of the electric machine connected with the center tap of the third inverter bridge 9 is called phase W. Between the plus pole of the first storage device and the inverter, a further circuit arrangement is situated consisting of two switches, which is called a direct-current bridge 10 and operates as a half bridge. The two switches are called a first half-bridge switch 11 and a second half-bridge switch 12. The path between the direct-current bridge and the inverter is called a direct-current path 13. The direct-current bridge takes up two states as a function of the switching states of the two half-bridge switches 11, 12. In these states, in each case, one of the two switches is closed and the respective other of the two switches is open. At no time is there a state in which either both switches of the half-bridge are closed or—except when there is an idle time—both switches of the half bridge are open.

Figure 2:
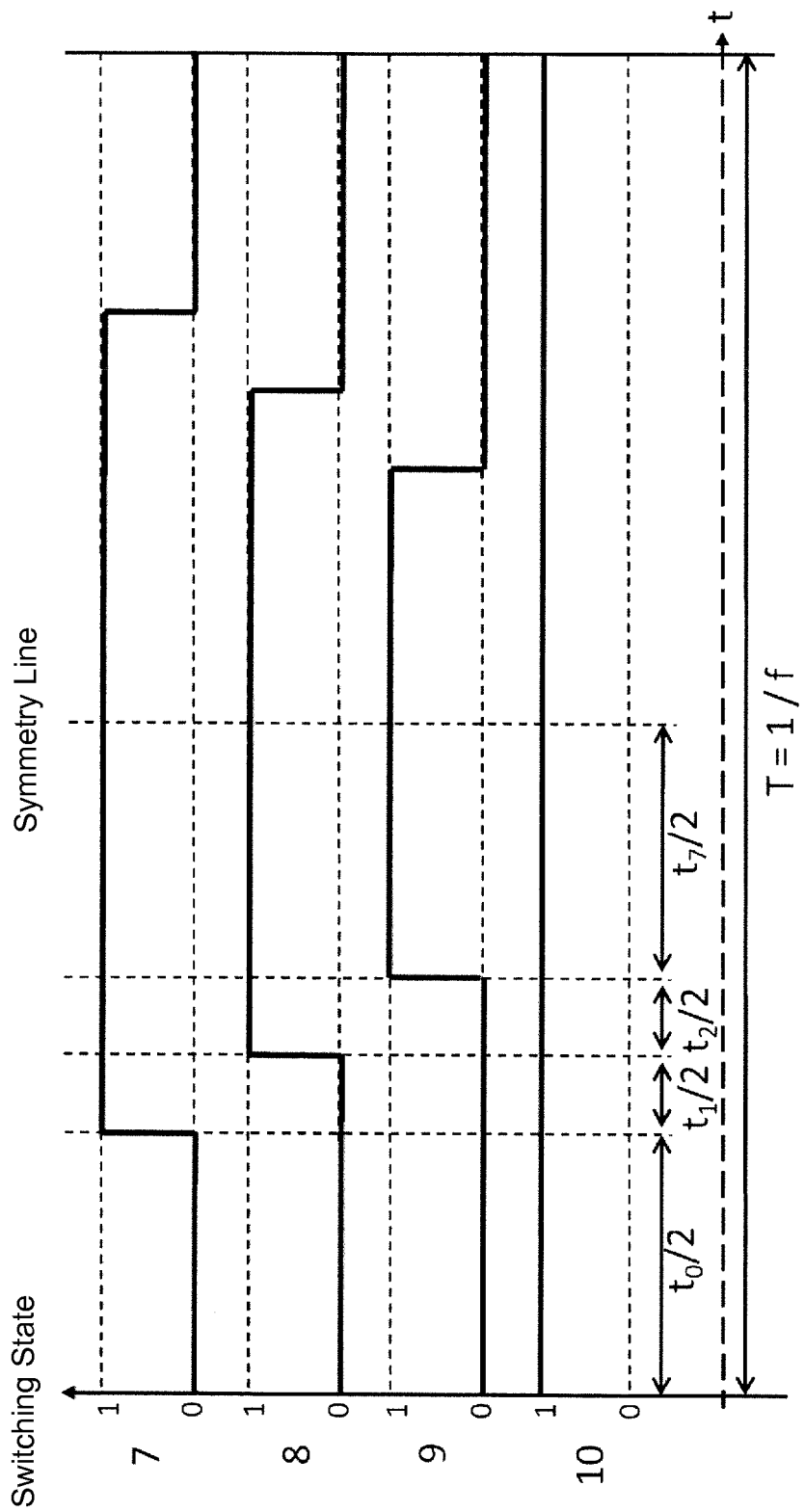
FIG. 2 is a schematic view of a conventional control process.
Figure 3:
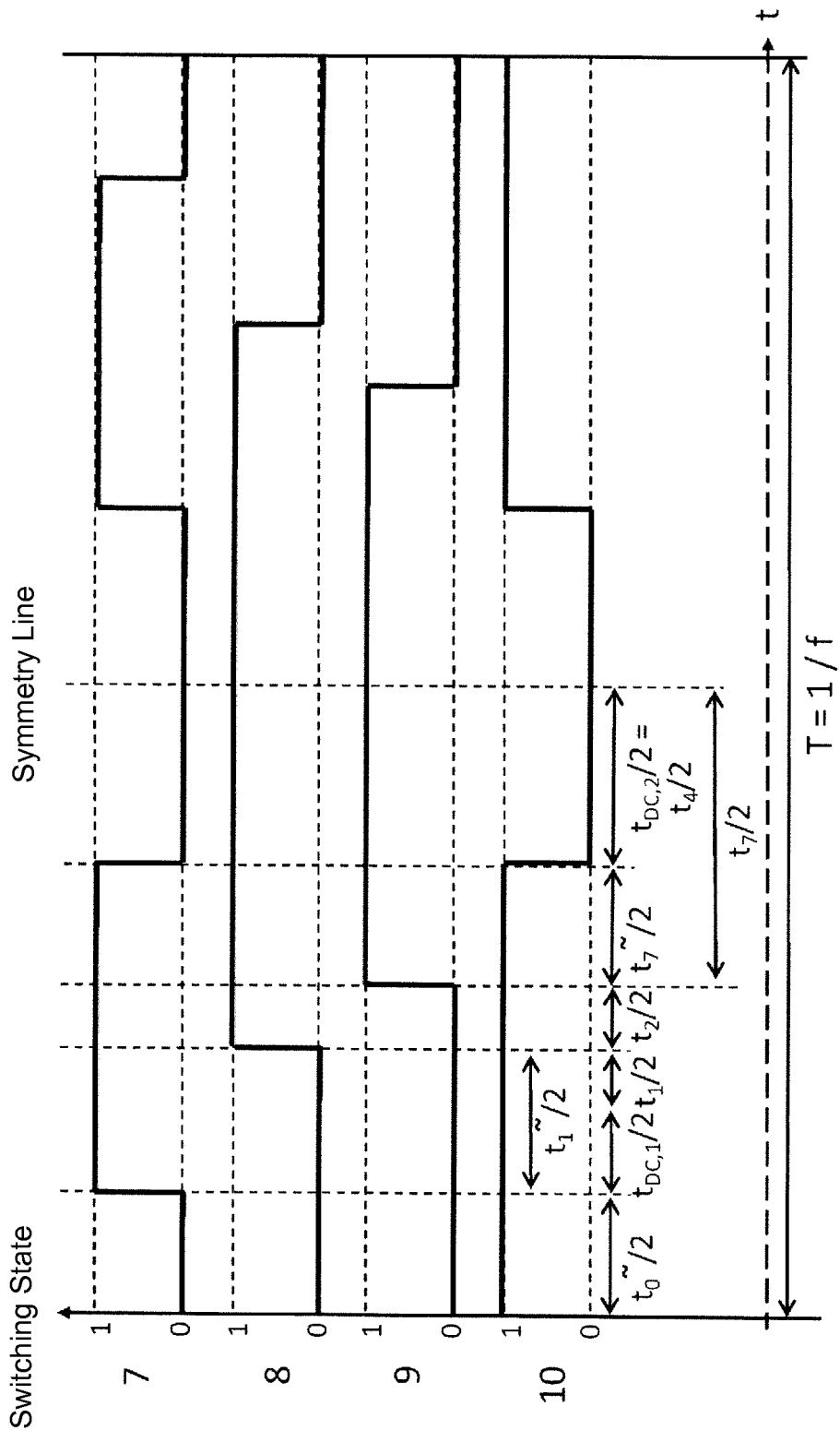
FIG. 3 is a schematic view of a novel control process for positive phase current.

In the case of a certain activation of the inverter and of the direct-current bridge, which is explained by way of FIGS. 2 and 3, the inductance of the electric machine, interacting with the switching states of the direct-current bridge, can lead in a targeted manner to states in which one of the two storage devices 1 or 2 is charged in each case with energy taken from the other of the two storages devices 1 or 2. Since this takes place independently of the voltage level of the two storage devices, this certain interaction of the direct-current bridge and the inductance of the electric machine corresponds to the functionality of a direct dc converter. The advantages of such an arrangement are, on the one hand, a result of the lower system costs because no separate direct dc converter is situated in the system. This is exhibited by further advantages, such as the saving of space and weight in a hybrid or electric vehicle.

FIG. 2 first illustrates a conventional control process for an inverter according to the knowledge of a person skilled in the art, which is based on the space vector modulation, for example, for a defined control point in time. It is first assumed in a simplifying manner that the voltage of the first storage device 1, $U_{DC,1}$, and the voltage of the second storage device 2, $U_{DC,2}$, are identical. The activation of an inverter in the space vector model, which is part of a field-oriented regulating of the electric machine, in this document, is assumed to be known from this technical field to a person skilled in the art. The time t is entered on the abscissa in FIG. 2. The clock pulse period T is inverse with respect to the clock pulse frequency f. The switching states of the three inverter bridges and of the direct-current bridge, which each have two states marked 0 and 1, are indicated on the ordinate. For the case of the three inverter bridges, state 1, in each case, describes the state in which the switch situated between the direct-current path 13 and the respective center tap is closed. In state 0, this switch is open and the switch between the center tap and the negative pole of the first storage device 1 is closed.

Since FIG. 2 involves a pulse-width modulated control process, the direct-current bridge will always be in the switching position 1, in which the first half-bridge switch 11 is closed and the second half-bridge switch 12 is open. Thus, at no point in time during the clock pulse period T, will there be a flow of electric power from the second storage device 2 or into the second storage device 2. A switching pulse in FIG. 2 is carried out in a symmetrical manner with respect to time. This is also indicated by the axis of symmetry. The switching time $t_0/2$ describes the setting of the zero vector $V_0$, which is determined in that the 0 state is set in the case of the three dc-ac converters. This is followed by the switching time period $t_1/2$, in which the bridge 7 is switched to state 1. In the selected space vector model, this corresponds to the point in time of the setting of the space vector 1, $V_1$. The switching time period $t_2/2$ will follow, in which also the bridge 8 is switched to state 1. This corresponds to the setting of the space vector 2, $V_2$. In the switch time period $t_7/2$, the three bridges 7, 8, 9 are switched to the state 1, which corresponds to the zero vector $V_7$. When the zero vector $V_7$ or the zero vector $V_0$ is set, while marginal effects are neglected, no current flow change is caused in the stator windings. The duration of the pulses $t_0$, $t_7$, $t_1$ and $t_2$ responds to the interrelationship $T = t_0 + t_7 + t_1 + t_2$.

With the duration of $t_1$ and $t_2$, point $P_1$ in the space vector model is obtained according to $$P_1 = V_1 \cdot t_1 + V_2 \cdot t_2 + V_0 \cdot t_0 + V_7 \cdot t_7 = V_1 \cdot t_1 + V_2 \cdot t_2.$$

FIG. 3 describes an improved switching profile for a circuit arrangement according to FIG. 1. The observation period in FIG. 3 is selected analogous to the point in time for the switching states selected as an example in FIG. 2. The electric machine in FIG. 3 is also assumed to be in the same operating state as in FIG. 2. In FIG. 3, the same point $P_1$ as in FIG. 2 is described by means of the vector addition in the space vector model. Also as in FIG. 2, the direct-current bridge 10 is switched to state 1 at the beginning of the clock pulse. At the beginning of a clock pulse, the zero vector $V_0$ is set in FIG. 3 for the duration of the switching time $t_0^\sim/2 = t_0/2 - t_{DC,1}/2$, because the three bridges 7, 8 and 9 are each switched to the 0 state. This is followed by a time period $t_1^\sim/2 = t_1/2 + t_{DC,1}/2$, in which the dc-ac bridge 7 is switched to state 1 and the direct-current bridge remains in the 0 state. This is followed by the switching time period $t_2/2$ in which also the bridge 8 is switched to state 1. Next in the control time sequence is the switching time period $t_7^\sim/2 = t_7/2 - t_{DC,2}/2$, in which the zero vector $V_7$ is set because the bridge 9 is also switched to state 1. It should be noted that the following applies: $t_{DC,1} = t_{DC,2}$.

Finally the switching time $t_{DC,2}/2 = t_4/2$ is implemented, in which the bridge 7 is switched to the 0 state, and the direct-current bridge is switched to the 0 state. As a result, the vector $V_4$ is set which, in the space vector model, is diametrically opposite the vector $V_1$. In the space vector model, point $P^\sim_1$ is therefore activated with $$P^\sim_1 = V_1 \cdot t_1^\sim / 2 + V_2 \cdot t_2 + V_0 \cdot t_0^\sim + V_7 \cdot t_7^\sim + V_4 \cdot t_4.$$

With the relations $$V_4 = -V_1 \text{ and}$$

$$t_{DC,1} = t_{DC,2} = t_4 \text{ as well as}$$

$$t_1^\sim = t_1 + t_{DC,1} = t_1 + t_{DC,2}, \text{ it follows that}$$

$$P^\sim_1 = V_1 \cdot t_1 + V_1 \cdot t_{DC,2} + V_2 \cdot t_2 + V_0 \cdot t_0^\sim + V_7 \cdot t_7^\sim - V_1 \cdot t_{DC,2} = V_1 \cdot t_1 + V_2 \cdot t_2 = P_1.$$

This indicates that, in the clock pulse schematically illustrated in FIG. 3, the same point is effectively activated as in FIG. 2. More simply stated, based on FIG. 2, in FIG. 3 the pulse width of the vector $V_1$ is extended by the switching time period $t_4$. In the same time period $t_4$, the vector $V_4$ diametrical to the vector $V_1$ is activated. As a consequence, under the given condition, the clock pulse period T remains unchanged, and that the switching times of the zero vectors $V_0$ and $V_7$ have to be reduced by twice the switching time $t_4$. The significant aspect of the control process illustrated in FIG. 3 is that, during the switching time period $t_{DC,2}$, in which the vector $V_4$ is set, the current direction in the direct-current path 13 is reversed. Since, during the same time period $t_{DC,2}$, the direct-current path is in the 0 state, i.e. the second half-bridge switch 12 is closed and the first half-bridge switch 11 is open, the storage device 2 is charged. The energy that can be charged into the storage device and that is drawn from the electric machine during the switching time $t_{DC,2}$ was fed into the electric machine during the switching time $t_{DC,1}$. The switching profile according to FIG. 3 therefore permits a power transfer from the first electric storage device 1 into the second electric storage device 2, which takes place by way of the electric machine. However, in this case, the machine takes up the same electrical and mechanical state as in FIG. 2 at the start and at the end of the clock pulse period T.

This process has the special advantage that the storage device 2 in FIG. 1 can be charged even under the condition that the voltage level of the second storage device 2 is situated in the direction of higher voltages in comparison to the voltage level of the first storage device 1. However, it is a perquisite here that, in the direct-current bridge, the half-bridge switches 11 and 12 are further developed without a free-wheeling diode. Instead, switches that block in both directions, such as two antiserially switched MOSFETs with free-wheeling diodes can be used under this condition. IGBTs can, for example, also be used. Summarizing, the control process according to FIG. 3 permits a bidirectional charge transfer between the two electric energy storage devices 1 and 2 in a manner corresponding to the use of a direct dc converter. Independently of the individual voltage levels of the two storage devices 1 and 2, a 4-quadrant operation of the electric machine is permitted that is known to a person skilled in the art.

Summarizing, the clock pulse sequence according to FIG. 3, with respect to the first storage device 1 and the second storage device 2, permits a functional simulation of a direct dc converter by way of the inductance of the electric machine 5 and of the direct-current bridge 10.

Figure 4:
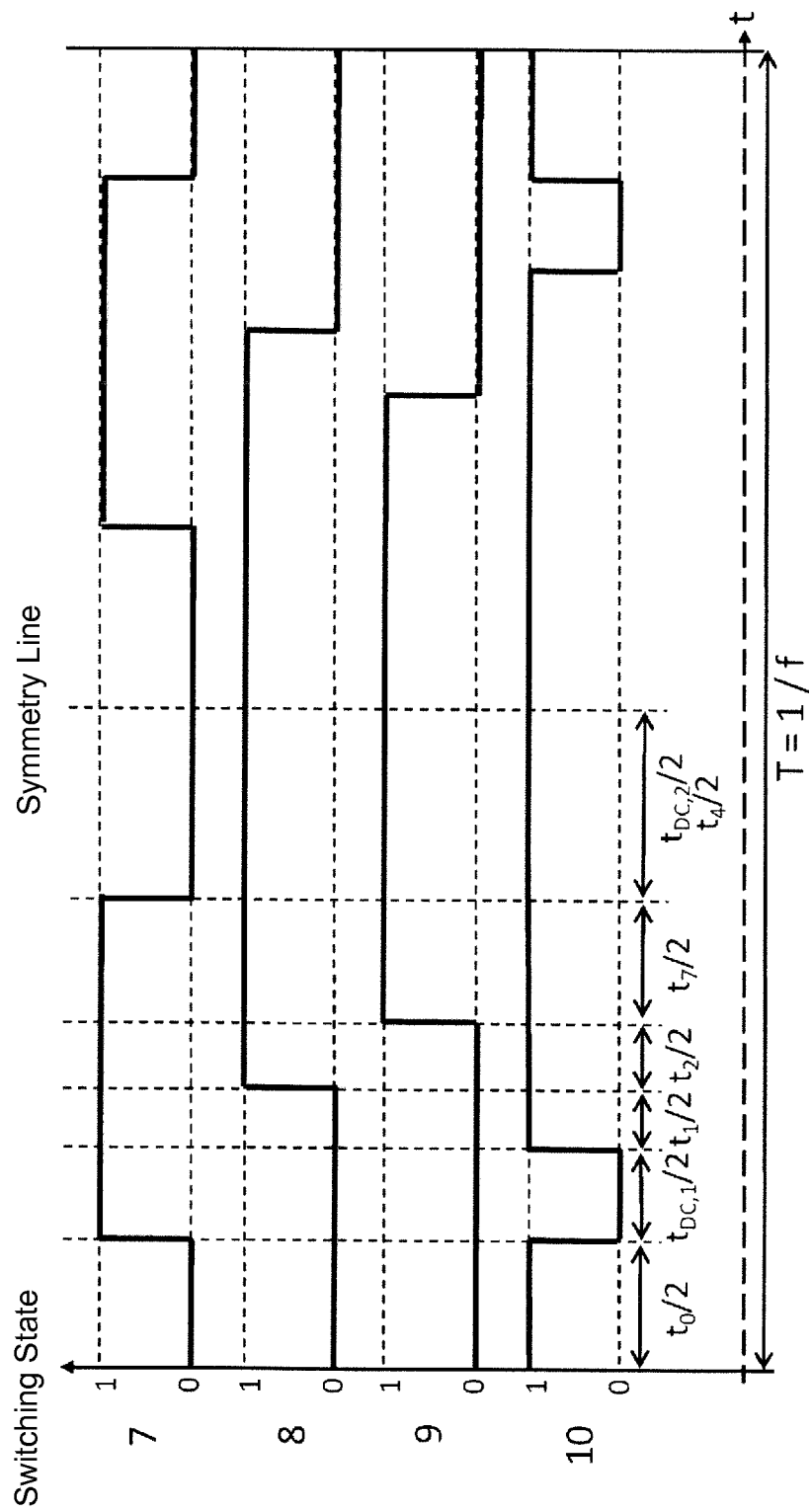
FIG. 4 is a schematic view of a novel control process for negative phase current.

FIG. 3 is subject to the assumption that, at the start of the illustrated clock pulse period T, the current in phase U, which is called $\uparrow_U$, will respond to the relation $|_U > 0$ if the vector $V_1$ is set, and that the second storage device 2 is to be charged by the first storage device 1. However, if the second storage device 2 is to be charged by the first storage device 1 and in the case of the setting of $V_1$, $|_U < 0$ applies, the switching profile according to FIG. 4 is used. The switching profile in FIG. 4 differs from the switching profile in FIG. 3 in that the direct-current bridge is not switched in the switching time period $t_{DC,2}$, in which the vector $V_4$ is set, into state 0 because it applies during $t_{DC,2}$, that $|_U > 0$.

In FIG. 4, the electric energy is transferred into the electric machine in this time period, which is drawn in the time period $t_{DC,1}$, when the vector $V_1$ is set by $|_U < 0$, in which case, it again applies that $t_{DC,1} = t_{DC,2}$. If there is to be a charge reversal of electric energy from the second storage device 2 to the first storage device 1, in the case of $|_U > 0$, for vector $V_1$, not the switching profile according to FIG. 3 will be used but the switching profile according to FIG. 4. If a charge reversal from storage device 2 into storage device 1 is to take place and, in the case of the setting of vector $V_1$, $|_U < 0$ applies, the switching profile according to FIG. 3 has to be used. The possibility of charging one of the two electric energy storage devices 1 or 2 from the respective other energy storage device of the two energy storage devices is independent of which of the two voltages $U_{DC,1}$ and $U_{DC,2}$ has a higher voltage level with respect to a common ground. Besides, the specification of the two electric energy storage devices is insignificant. The two storage devices may, for example, be a lithium ion battery with a high-voltage level or a low-voltage storage device, for example, a 12 V lead acid battery or a dual-layer capacitor. If no dc decoupling of the storage devices is necessary, any arbitrary combination of a high-voltage storage device and a low-voltage storage device is possible.

In addition, it should be noted that the embodiment is not limited to the use of an electric machine as a load for the inverter. A different inductive load, such as a transformer, can also be used.

It should further be noted that the time $T_{DC}$ is used for the targeted regulating of the charging voltage of a storage device as the desired quantity analogous to the controlling or regulating of a dc-dc converter. The time $T_{DC}$ corresponds to the sum of the two individual times $T_{DC} = t_{DC,1} + t_{DC,2}$. By means of $t_{DC,1} = t_{DC,2}$, $T_{DC} = 2 \cdot t_{DC,1}$ is obtained. Furthermore, the following applies as a marginal condition to the permissible clock pulse period $T = t_0 + t_7 + t_1 + t_2 + t_{DC,1} + t_{DC,2} = t_0 + t_7 + t_1 + t_2 T_{DC}$, so that $T_{DC}$ can be extended to a maximal duration at which the value of the sum of the zero times $t_0 + t_7$ will disappear. As a further marginal condition, it should be observed that a predefined point $P_1$ is set in the space vector model. By means of a constant controller, for example, a PI controller, the voltage and the energy transfer of the storage device 1 or 2 can therefore be influenced in a targeted manner.

The embodiment is subject to the assumption that the voltages of the storages devices 1 and 2 are identical: $U_{DC,1} = U_{DC,2}$. Thus, $t_{DC,1} = t_{DC,2}$ also applies. However, this is generally not so because the two storage devices 1 and 2 are coupled with different voltage positions. Since the space vector model is usually standardized to the intermediate-circuit voltage, this means, for example, in FIG. 3 that the product $t_1 \cdot V_1$ and therefore the resulting space vector is a function of the length of the set space vector $V_1$. In the case of FIG. 3, this is synonymous with a dependence on the voltage of the first storage device 1, $U_{DC,1}$. This correspondingly applies to the vector $V_4 = -V_1 \cdot U_{DC,2}/U_{DC,1}$. Therefore, in order to continue to set the predefined point $P_1$ in the space vector model and to charge the storage device 2, the times $t_{DC,1}$ and $t_{DC,2}$ are to be proportioned corresponding to the voltages of the storage devices, $U_{DC,1}$ and $U_{DC,2}$, according to $t_{DC,1} \cdot U_{DC,1} = t_{DC,2} \cdot U_{DC,2}$. If the voltage of the second storage device 2 is, for example, $U_{DC,2} = 12$ V, and the voltage of the first storage device 1 is, for example, $U_{DC,1} = 60$ V, then: $t_{DC,2} = 5 \cdot t_{DC,1}$. Because $t_{DC,1} \neq t_{DC,2}$, the zero times $t_0^\sim$ and $t_7^\sim$, for which the symmetry condition $t_0^\sim = t_7^\sim$ should always be observed, are computed according to:

$$t_0^\sim = t_7^\sim = (t_0 + t_7 - T_{DC})/2 = (2 \cdot t_0 - T_{DC})/2 = t_0 - T_{DC}/2,$$

wherein $$T_{DC} = t_{DC,1} + t_{DC,2}.$$

For point $P_1^\sim$, these relations result in:

$$P_1^\sim = V_1 \cdot t_1 + V_1 \cdot t_{DC,1} + V_2 \cdot t_2 + V_0 \cdot t_0^\sim + V_7 \cdot t_7^\sim + V_4 \cdot t_{DC,2} = P_1^\sim = V_1 \cdot t_1 + V_1 \cdot t_{DC,1} + V_2 \cdot t_2 + (-V_1 \cdot U_{DC,2}/U_{DC,1}) \cdot (t_{DC,1} \cdot U_{DC,1}/U_{DC,2}) = P_1.$$

By means of this concrete further development of FIGS. 3 and 4, the predefined space vector $P_1$ will be set even when the voltage position deviates, and an energy storage device will be charged according to the description of FIGS. 3 and 4.

In DE 10 2008 037 064 A1, a process is described according to which two half-bridge switches in a circuit arrangement comparable to the embodiment in FIG. 1 with two electric energy storage devices and an electric machine are activated in an essentially pulse-width-modulated manner according to FIG. 2. By means of such a process, a charging of a defined storage device can be achieved over an averaged time of the operation of the electric machine. In contrast to this process, the inventive control process according to FIGS. 3 and 4 has the advantage that a targeted energy management of the energy storage devices can be ensured. Since, in the case of an electric machine, the current direction in the direct-current path 13 in the conventional switching process according to FIG. 2 is changeable as a function of the state of the machine, the controlling of the half bridge has to take place as a function of the current direction in the direct-current path in order to permit a targeted charging of the storage device. Otherwise, an immediate current reversal would lead to voltage instabilities which, as overvoltages or undervoltages, could interfere with possibly connected components or could even damage them (such as control devices or unidirectionally operated fuel cells). Although, for preventing such interferences or damages, buffer storage devices can be used, a continuous charging operation, however, is not possible under these conditions. In particular, in addition, unnecessary power losses would occur as a result of an occurring reactive power. If, for example, the half-bridge branch 12 is closed for a defined switching time, in which the current in the direct-current path changes the current direction, the occurring reactive power will also be considerable when a charging current into the storage device occurs over an averaged time.

A further advantage of the inventive control process according to FIGS. 3 and 4 is exhibited by the reduction of the switching times of the zero vectors. More power is thereby fed to the system without negatively influencing the actual functionality. The additional power flow means a higher capacity utilization of the system. Irrespective of the voltage difference of the two energy storage devices 1 and 2, the control process according to FIGS. 3 and 4 permits the setting of a predefined point $P_1$ in the space vector model. In the case of a simple pulse-width-modulated process without the setting of two diametrical vectors within one clock pulse, a high voltage difference between the storage devices may have the result that a voltage to be set at the storage device with the higher voltage position can be set only when a point deviating from point $P_1$ is set in the space vector model. This would result in rotational non-uniformities or losses of torque at the electric machine.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SYMBOLS

1 First electric energy storage device
2 Second electric energy storage device
3 First intermediate circuit capacitor
4 Second intermediate circuit capacitor
5 Electric machine
6 Inverter
7 First inverter bridge
8 Second inverter bridge
9 Third inverter bridge
10 Direct current bridge
11 First half-bridge switch
12 Second half-bridge switch
13 Direct-current path
$I_U$ Current of phase U
t Time
T Clock pulse period
f Clock pulse frequency
$V_0$ Space vector 0, zero vector
$V_7$ Space vector 7, zero vector
$V_1$ Space vector 1
$V_2$ Space vector 2
$P_1$ Point $P_1$ in the space vector model
$P_1^\sim$ Point $P_1^\sim$ in the space vector model
$t_0$ a switching time of $V_0$
$t_0^\sim$ a switching time of $V_0$
$t_1$ a switching time of $V_1$
$t_1^\sim$ a switching time of $V_1$
$t_2$ a switching time of $V_2$
$t_2^\sim$ a switching time of $V_2$
$t_4$ Switching time of $V_4$
$t_7$ a switching time of $V_7$
$t_7^\sim$ a switching time of $V_7$
$t_{DC,1}$ First charging time
$t_{DC,2}$ Second charging time
$T_{DC}$ Total charging time
$U_{DC,1}$ Voltage position of the first electric energy storage device
$U_{DC,2}$ Voltage position of the second electric energy storage device
U Phase U
V Phase V
W Phase W

What is claimed is:

1. A power electronics arrangement, comprising:
an electric machine;
a first electric energy storage device having a first voltage level, wherein the first electric energy storage device supplies the electric machine with electric energy;
a second electric energy storage device having a second voltage level;
an inverter connected to the electric machine, wherein the inverter includes a plurality of bridges; and
at least one half bridge connected to and between the inverter and each of the first and second electric energy storage devices,
wherein, by interaction of respective on/off states of the plurality of bridges with on/off states of the at least one half bridge, electric energy drawn into the electric machine from the first electric energy storage device is fed from the electric machine into the second electric energy storage device, such that the first electric energy storage device charges the second electric energy storage device via the electric machine and the half bridge without a dc-dc converter and irrespective of which of the first voltage level and the second voltage level is greater with respect to a common ground.

2. A control method for operating the power electronics arrangement of claim 1, the control method comprising the acts of:

as a result of a clock pulse of the inverter, setting a predefined space vector by vector addition of space vectors in a space vector model;

during the clock pulse of the inverter, setting a first space vector for a first switching time;

during the clock pulse of the inverter, setting a space vector diametrical with respect to the first space vector for a second switching time; and during the first switching time or during the second switching time, switching the half bridge to charge the second electric energy storage devices via the electric machine and the half bridge.

3. A motor vehicle, comprising the power electronics arrangement of claim 1.

4. The power electronics arrangement of claim 1, wherein the first electric energy storage device charges the second electric energy storage device via the electric machine and the half bridge, according to an inverter-related timing.

5. The power electronics arrangement of claim 1, wherein the half bridge comprises at least one half bridge switch configured to switch the half bridge between switching states, and wherein the first electric energy storage device charges the second electric energy storage device via the electric machine and the half bridge, based on the switching state of the half bridge.

6. The power electronics arrangement of claim 5, wherein the half bridge switch comprises exactly two half bridge switches.

7. The power electronics arrangement of claim 1, wherein the electric energy charging the second electric energy storage device is drawn from the electric machine, and is supplied to the electric machine by the first electric energy storage device during a switching period according to which the half bridge switches states.

8. The power electronics arrangement of claim 1, wherein the first electric energy storage device charges the second electric energy storage device via the electric machine and the half bridge when the second voltage level is higher than the first voltage level.

9. The power electronics arrangement of claim 1, wherein the half bridge is connected between the inverter and a plus pole of the first electric energy storage device.

10. The power electronics arrangement of claim 9, wherein the half bridge is further connected between the inverter and a plus pole of the second electric energy storage device.

* * * * *